(12) United States Patent
Garbow

(10) Patent No.: US 7,571,394 B2
(45) Date of Patent: Aug. 4, 2009

(54) RETRIEVING DATA BASED ON A REGION IN A GRAPHICAL REPRESENTATION

(75) Inventor: Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/138,935

(22) Filed: May 26, 2005

(65) Prior Publication Data

US 2006/0271865 A1 Nov. 30, 2006

(51) Int. Cl.
*G06F 3/048* (2006.01)
(52) U.S. Cl. ............... 715/789; 709/224; 715/764
(58) Field of Classification Search ........... 715/764, 715/789; 709/224
See application file for complete search history.

(56) References Cited

U.S. PATENT DOCUMENTS

| | | | |
|---|---|---|---|
| 5,740,549 A * | 4/1998 | Reilly et al. ............... | 705/14 |
| 6,470,386 B1 * | 10/2002 | Combar et al. ............... | 709/224 |
| 2004/0141003 A1 * | 7/2004 | Nivers et al. ............... | 345/745 |
| 2006/0101212 A1 * | 5/2006 | Biswal et al. ............... | 711/162 |
| 2006/0149695 A1 * | 7/2006 | Bossman et al. ............... | 706/48 |
| 2008/0214186 A1 * | 9/2008 | Bizzarri et al. ............... | 455/425 |

\* cited by examiner

*Primary Examiner*—Weilun Lo
*Assistant Examiner*—Kim-Lynn Dam
(74) *Attorney, Agent, or Firm*—Owen J. Gamon

(57) ABSTRACT

A method, apparatus, system, and signal-bearing medium that, in an embodiment, display a graphical representation of data that changes over time, create a region in the graphical representation, retrieve data from a database based on the region, and create a graphical representation of the retrieved data. In various embodiment, a profile is created and the data is retrieved based on the profile. The profile may include a schedule for retrieving the data, an identification of the region, an identification of a key, an identification of an x-axis, and an identification of a y-axis. In an embodiment, an union of multiple profiles is created, and data in the database that is not represented by the union is deleted. In another embodiment, regions that are adjacent in time are concatenated. In another embodiment, the creation of the graphical representation may be separated into multiple units of work for execution in a network if a workload at a computer exceeds a threshold.

16 Claims, 8 Drawing Sheets

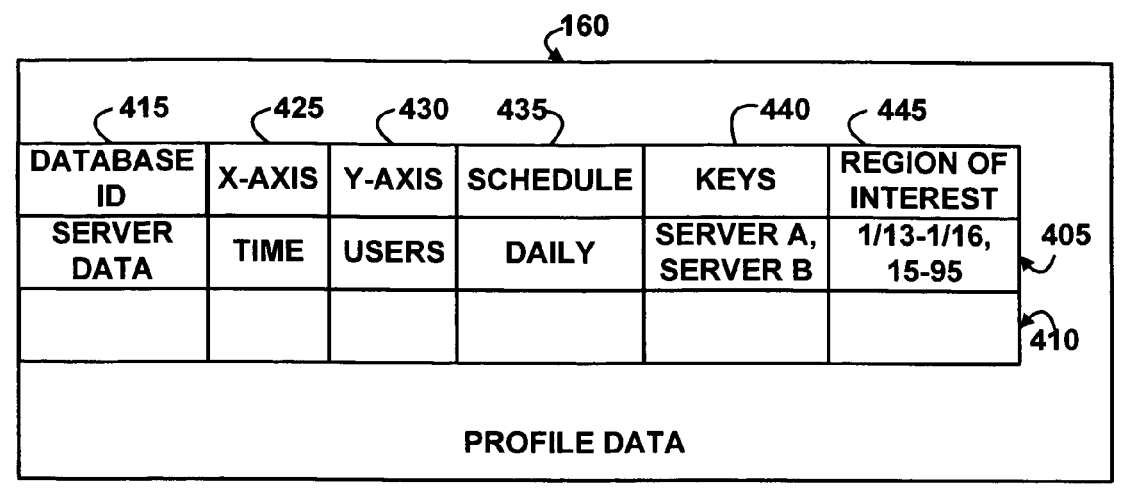

| DATABASE ID (415) | X-AXIS (425) | Y-AXIS (430) | SCHEDULE (435) | KEYS (440) | REGION OF INTEREST (445) |
|---|---|---|---|---|---|
| SERVER DATA | TIME | USERS | DAILY | SERVER A, SERVER B | 1/13-1/16, 15-95 |
| | | | | | |
| PROFILE DATA | | | | | |

FIG. 4

RETRIEVING DATA BASED ON A REGION IN A GRAPHICAL REPRESENTATION

FIELD

This invention generally relates to computer systems and more specifically relates to retrieving data related to graphical representations.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Many computer programs exist that collect statistics or other data on an ongoing basis over time. In various environments, these statistics might reflect events that occur internal to the computer system or external to the computer system. Examples of events that can occur internal to a computer system include the number of users who access the computer system, the number of jobs or processes executing, the number of errors encountered, or the amount of memory in use. Examples of events that can occur external to the computer system, but for which statistical data can be detected, collected, or received, include the room temperature, the atmospheric pressure, or the number of vehicles that pass by a certain road location. Many other examples are possible, and a wide variety of statistical data is prevalent in all aspects of science, education, business, and government, but the characteristic that all of these examples share is that they are capable of changing over time.

Users often want to periodically (e.g., daily, weekly, monthly, or yearly) review and analyze these types of statistical data, in order to determine anomalies and/or trends in the data as the data changes. Users typically experience that a graphical visualization or presentation of the data is helpful in aiding their understanding and analysis of the data. For example, a bar chart of vehicle data graphically illustrating that the number of cars on a road peaks during rush hour is far easier to understand than viewing a column of times and associated numbers.

In an attempt to help users understand their data, many examples of graphing and visualization software exist, but they all require the user to manually enter data limits, thresholds, and other parameters. For example, users must manually enter a specification of the data they wish to view and manually enter the time periods associated with that data. This manual process is cumbersome and error prone.

Thus, there is a need for a better technique for aiding users in specifying the data that they wish to view.

SUMMARY

A method, apparatus, system, and signal-bearing medium are provided that, in an embodiment, display a graphical representation of data that changes over time, create a region in the graphical representation, retrieve data from a database based on the region, and create a graphical representation of the retrieved data. In various embodiment, a profile is created and the data is retrieved based on the profile. The profile may include a schedule for retrieving the data, an identification of the region, an identification of a key, an identification of an x-axis, and an identification of a y-axis. In an embodiment, an union of multiple profiles is created, and data in the database that is not represented by the union is deleted. In another embodiment, regions that are adjacent in time are concatenated. In another embodiment, the creation of the graphical representation may be separated into multiple units of work for execution in a network if a workload at a computer exceeds a threshold.

BRIEF DESCRIPTION OF THE DRAWINGS

Various embodiments of the present invention are hereinafter described in conjunction with the appended drawings:

FIG. 4 depicts a block diagram of example profile data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
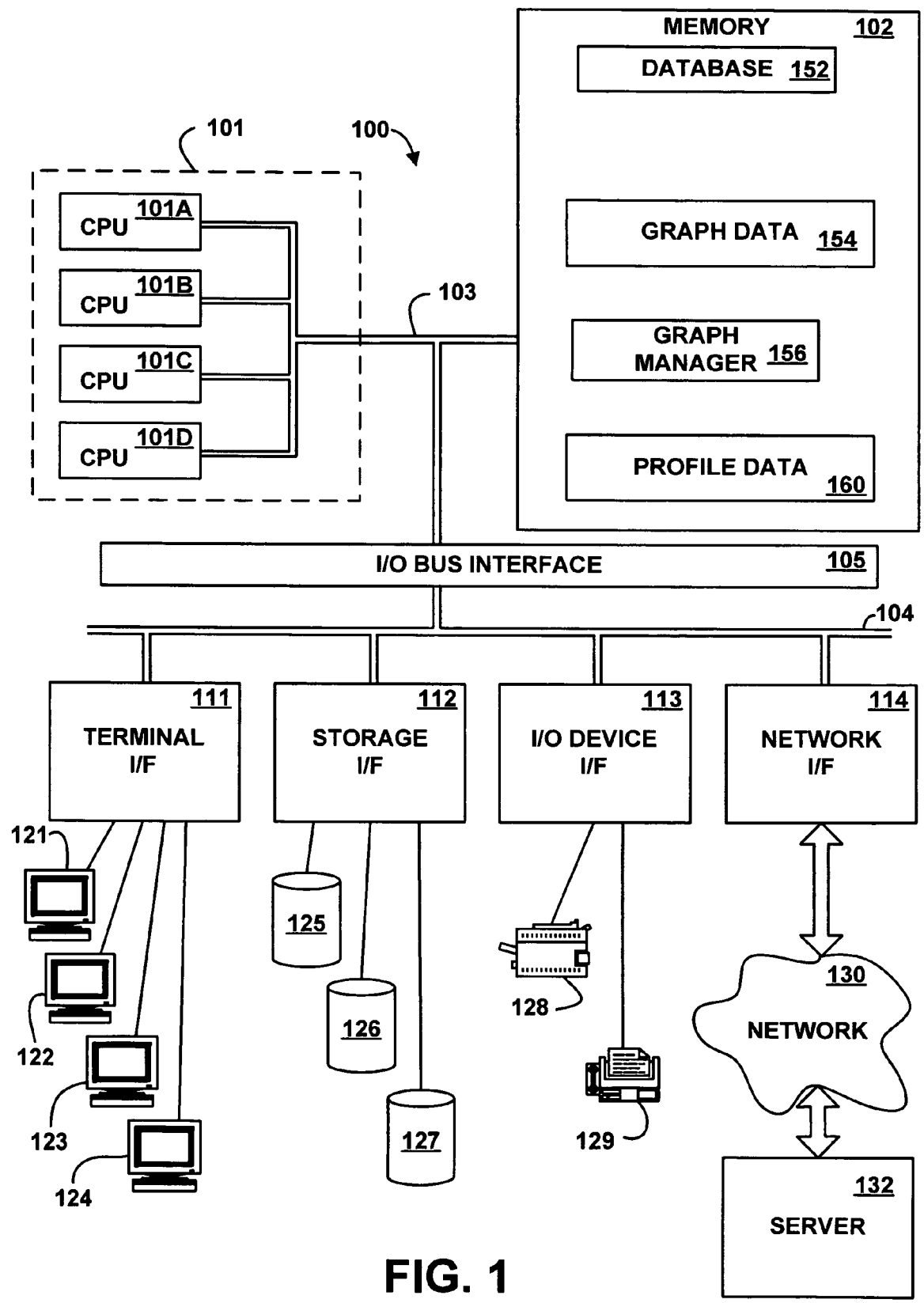
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a server 132, according to an embodiment of the present invention. The terms "computer" and "server" are used for convenience only, and an electronic device that acts as a server in one embodiment may act as a client in another embodiment. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a database 152, graph data 154, a graph manager 156, and profile data 160. Although the database 152, the graph data 154, the graph manager 156, and the profile data 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database 152, the graph data 154, the graph manager 156, and the profile data 160 are illustrated as being contained within the main memory 102, these elements are not necessarily all completely contained in the same storage device at the same time. Further, although the database 152, the graph data 154, the graph manager 156, and the profile data 160 are illustrated as being separate entities, in other embodiments some of them, or portions of some of them, may be packaged together.

The database 152 stores statistical data that is captured over time and that may change over time. The database 152 may be configured as a relational database with one or more tables, rows, columns, and optional indexes, may be configured as a flat file, or may be configured as any appropriate data repository. Although only one database 152 is illustrated, in other embodiments any number of databases may be present.

The graph data 154 contains a selected subset of the data in the database 152 and is formatted in such a way so as to facilitate display in graphical form. One example display of the graph data 154 in graphical form is further described below with reference to FIG. 2.

The graph manager 156 interprets the graph data 154 for display in graphical form, creates the profile data 160, and uses the profile data 160 to create additional graph data 154 and to perform manipulations on the database 152. The graph manager 156 includes instructions capable of executing on the processor 101 or statements capable of being interpreted by instructions executing on the processor 101 to perform the functions as further described below with reference to FIGS. 5, 6, 7, 8, and 9. In another embodiment, the graph manager 156 may be implemented in microcode or firmware. In another embodiment, the graph manager 156 may be implemented in hardware via logic gates and/or other appropriate hardware techniques in lieu of or in addition to a processor-based system.

The profile data 160 includes a specification of data in the graph data 154 and a schedule, which together may be used to selectively retrieve data from the database 152, where the retrieved data is associated with a different time. The profile data 160 is further described below with reference to FIG. 4.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The server 132 may include some or all of the hardware and/or software elements previously described above for the computer system 100. In another embodiment, the server 132 is optional, not present, or not used.

It should be understood that FIG. 1 is intended to depict the representative major components of the computer system 100, the network 130, and the server 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

Such signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figures 2, 3:
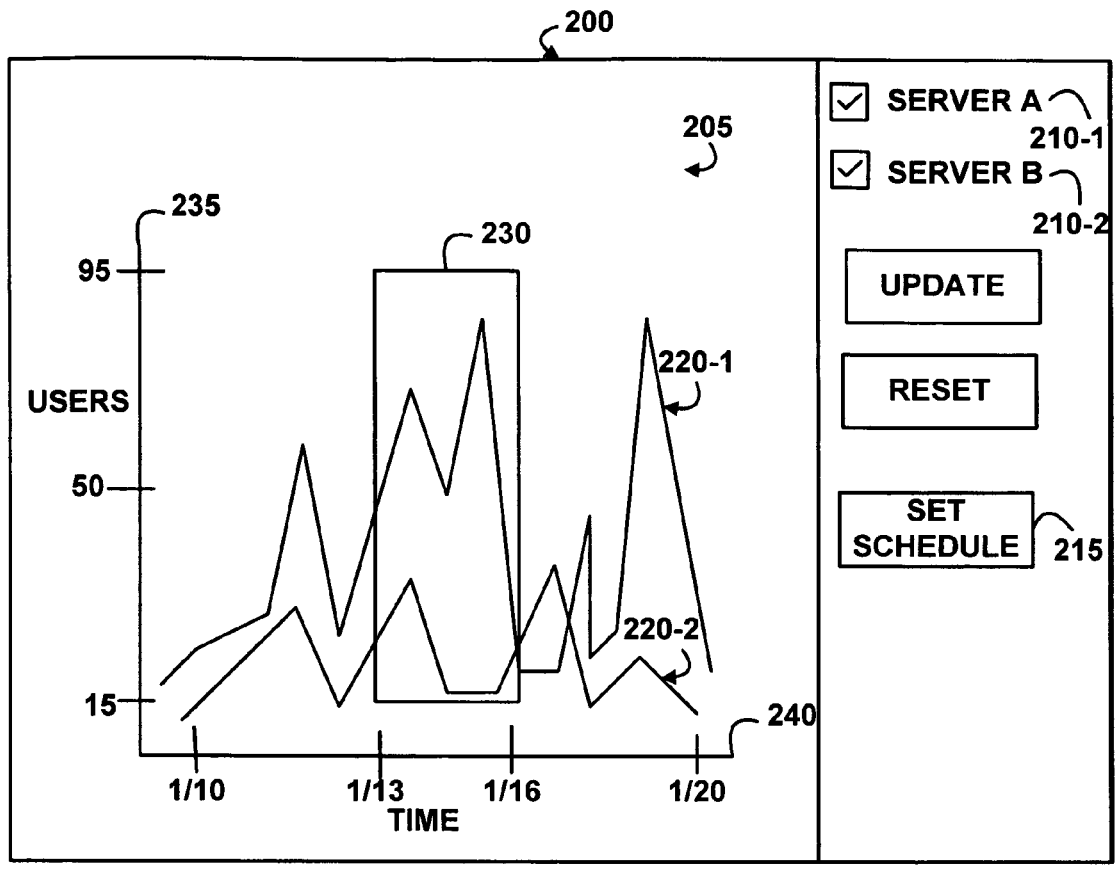
FIG. 2 depicts a block diagram of an example user interface, according to an embodiment of the invention.
FIG. 3 depicts a block diagram of an example user interface dialog for setting a schedule, according to an embodiment of the invention.

FIG. 2 depicts a block diagram of an example user interface 200, according to an embodiment of the invention. The graph manager 156 creates the user interface 200, which is capable of being displayed on one or more of the terminals 121, 122, 123, and/or 124, or any other display device, e.g., connected via the network 130. The example user interface 200 includes a graphical representation 205 of the graph data 154 (FIG. 1), keys 210-1 and 210-2, and a set schedule button 215. The keys 210-1 and 210-2 are generically referred to herein as the keys 210. The graphical representation 205 of the graph data 154 includes graphs 220-1 and 220-2, which represent data associated with the keys 210-1 and 210-2, respectively.

The graphs 220-1 and 220-2 are displayed on a y-axis 235 (a vertical axis) and an x-axis 240 (a horizontal axis), which form a Cartesian coordinate system in two dimensions, but in other embodiments any number of dimensions and any appropriate type of coordinate system may be used. In the example interface 200 of FIG. 2, the y-axis 235 represents a number of users, and the x-axis 240 represents time, but in other embodiments any data may be represented on any axis. Thus, in the example user interface 200, the graph 220-1 represents the number of users (on the y-axis 235) over time (on the x-axis 240) who access the server A (the key 210-1), and the graph 220-2 represents the number of users (on the y-axis 235) over time (on the x-axis 240) who access the server B (the key 210-2). The graph manager 156 uses the keys 210-1 and 210-2 to determine the data to display within a continuous series in the graphical representation 205.

The graphical representation 205 of the graph data 154 also includes a region of interest 230, which represents the portions of the graphs 220-1 and 220-2 that occur between the times (on the x-axis 240) of "1/13" and "1/16." Via manipulation of the user interface 200 with a keyboard, other data entry device, or mouse or other pointing device, the user may request the graph manager 156 to create the region of interest 230, to zoom in or out of the region of interest 230 (show more or less detail), and to create, activate, or deactivate the keys 210.

The user interface 200 also includes a set schedule button 215. In response to the set schedule button 215 being activated, the graph manager 156 presents a user interface dialog, as further described below with reference to FIG. 3. The user interface elements and data illustrated in the user interface 200 are examples only, and in other embodiments any appropriate elements and data may be present.

FIG. 3 depicts a block diagram of an example user interface dialog 300 for setting a schedule for extracting data from the database 152 (FIG. 1) to create the graph data 154, according to an embodiment of the invention. The example user interface dialog 300 is displayed on, e.g., one or more of the terminals 121, 122, 123, or 124 (FIG. 1) by the graph manager 156 in response to selection of the set schedule button 215 (FIG. 2).

The example user interface dialog 300 includes save method values 305 and 310 and schedule values 315, 320, and 325. The save method 305 requests the graph manager 156 to save a new graph data 154 using the same name as a previous graph data 154. The save method 310 requests the graph manager 156 to save new graph data 154 using a different name from the previous graph data 154.

The daily schedule 315 requests the graph manager 156 to create new graph data 154 by extracting the data specified by the user interface 200 (FIG. 2) from the database 152 on a daily basis. The weekly schedule 320 requests the graph manager 156 to create new graph data 154 by extracting the data specified by the user interface 200 from the database 152 on a weekly basis. The monthly schedule 325 requests the graph manager 156 to create new graph data 154 by extracting the data specified by the user interface 200 from the database 152 on a monthly basis. Although daily, weekly, and monthly are illustrated for the schedule 315, 320, or 325, respectively, in other embodiments, the schedule many be every minute, every hour, or any scheduled interval. In another embodiment, the schedule may be expressed in terms of times and/or dates instead of in terms of regular intervals. In an embodiment, the graph manager 156 chooses the default schedule (whether daily 315, weekly 320, or monthly 325 is initially presented as selected) to present in the dialog 300 based on the time duration of the region of interest 230. For example, the time duration of the region of interest 230 in FIG. 2 is three days (the difference between 1/13 and 1/16 on the x-axis 240), so the default schedule is shown as daily 315 in the dialog 300. But, if the time duration of the region of interest 230 were seven days, then the graph manager 156 presents the default schedule as weekly 320 in the dialog 300, and if the time duration of the region of interest 230 were 30 days, then the graph manager 156 presents the default schedule as monthly 325 in the dialog 300. The default schedule may be changed to another schedule value via manipulation of the dialog 300.

In response to the user interface dialog 300, the graph manager 156 creates the profile data 160, which represents a profile for extracting data from the database 152 based on the data displayed in the graphical representation 205 in the user interface 200 (FIG. 2) and for creating the graph data 154 from the extracted data on the schedule indicated in the user interface dialog 300.

FIG. 4 depicts a block diagram of example profile data 160, according to an embodiment of the invention. The example profile data 160 includes records 405 and 410, but in other embodiments any number of records with any appropriate data may be present. Each of the records 405 and 410 includes a database identifier field 415, an x-axis field 425, a y-axis field 430, a scheduled time field 435, a keys field 440, and a region of interest field 445. The database identifier field 415 identifies a database in the databases 152.

The x-axis field 425 indicates the value associated with the x-axis 240 (FIG. 2) of the representation 205 of the graph data 154 (FIG. 1). The y-axis field 430 indicates the value associated with the y-axis 235 (FIG. 2) of the representation 205 of the graph data 154 (FIG. 1). The scheduled time field 435 specifies the scheduled time interval for which the graph manager 156 is to retrieve data from the database 152, as specified by one of the schedules 315, 320, or 325 (FIG. 3). The keys field 440 indicates a subset of the data in the database 152 (FIG. 1). The region of interest 445 indicates the selected region of interest 230 (FIG. 2). In an embodiment, the region of interest field 445 specifies the range of data values associated with the region of interest 230 on the x-axis 240 and the y-axis 235, or any other appropriate axis. Using the example of FIG. 2, the range of data values associated with the region of interest 230 on the x-axis is the dates "1/13-1/16," and the range of data values associated with the region of interest 230 on the y-axis is the number of users "15-95." A time duration that reflects the duration of the region of interest 445 (e.g., three days reflects the time duration of 1/13 through 1/16, as described in record 405) may be calculated from the region of interest 445.

In various embodiments, the database identifier field 415, x-axis field 425, the y-axis field 430, the scheduled time field 435, the keys field 440, and the time duration calculated from the region of interest 445, individually or in a partial or complete combination, may be used to select data from the database 152. For example, in various embodiments, the database identifier 415, the x-axis field 425, the y-axis field 430, the scheduled time field 435, the keys field 440, and the time duration may specify (or may be used to specify) a partition, a table(s), rows, a column(s), a field(s), and/or an index or indexes in the database 152 (FIG. 1). In various embodiments, all or a combination of some of the database field 415, the x-axis field 425, the y-axis field 430, and the keys field 440 are a specification of the graph data 154 represented by the graphical representation 205.

The graph manager 156 may retrieve data from the database 152 using this specification of the graph data 154, the time duration calculated from the region of interest 445, and the schedule 435. That retrieved data may be different from the graph data 154 represented by the graphical representation 205 because the data may change over time (e.g., the number of users that access a server may change over time). Since the retrieved data is retrieved in the future, as indicated by the schedule 435, and is associated with a future time period (the future time at which it is retrieved and a time duration calculated from the region of interest 445), the retrieved data may be different from the original graph data 154, from which the specification used to retrieve the data was built.

Figure 5:
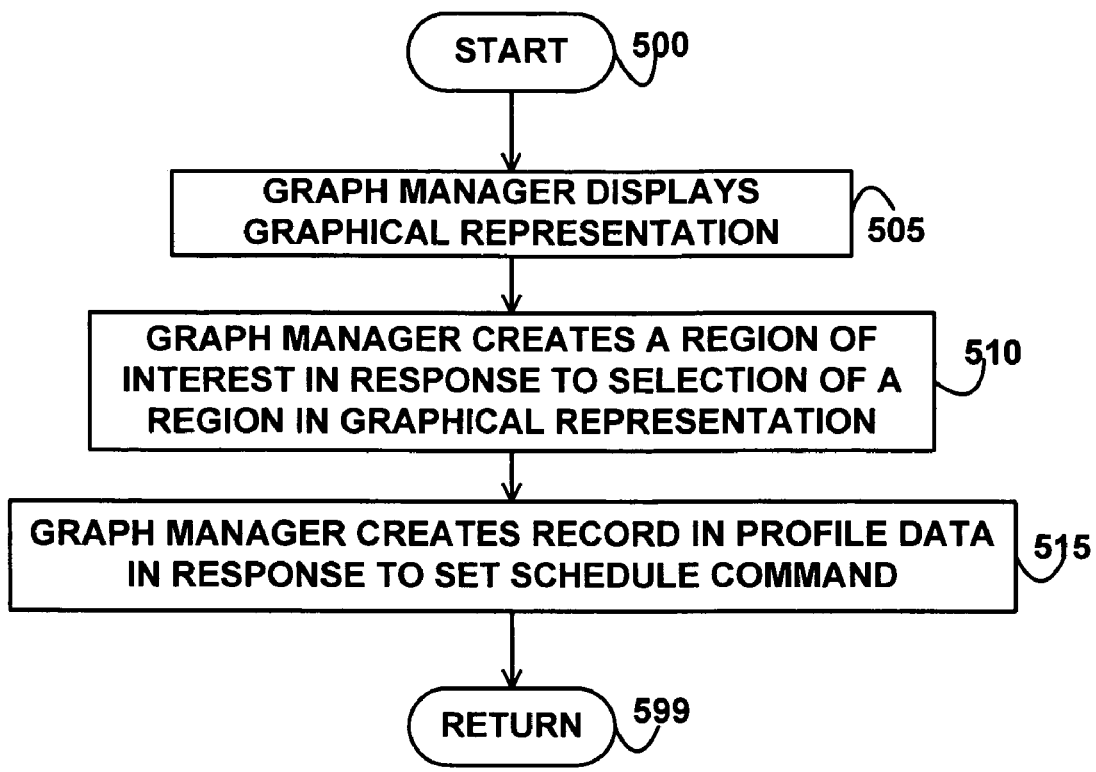
FIG. 5 depicts a flowchart of example processing for the creation of a record in the profile data, according to an embodiment of the invention.

FIG. 5 depicts a flowchart of example processing for the creation of a record in the profile data 160, according to an embodiment of the invention. Control begins at block 500. Control then continues to block 505 where the graph manager 156 displays the graphical representation 205 of the graph data 154, as previously described above with reference to FIG. 2. Control then continues to block 510 where the graph manager 156 creates the region of interest 230 (FIG. 2) in response to selection of a region in the user interface 200, e.g., by a keyboard, other data entry device, or mouse or other pointing device.

Control then continues to block 515 where the graph manager 156 creates a record (such as one of the records 405 or 410 in FIG. 4) in response to the set schedule command 215 and the dialog 300. The graph manager 156 sets the database identifier field 415 in the created record to identify the database in the database 152 associated with the data displayed in the representation 205 of the graph data 154. The graph manager 156 sets the x-axis field 425 in the created record to contain a value associated with the x-axis (240) in the representation 205. The graph manager 156 sets the y-axis field 430 in the created record to contain a value associated with the y-axis (235) in the representation 205. The graph manager 156 sets the scheduled time field 435 in the created record to reflect the schedule value 315, 320, or 325, as requested by the dialog 300 (FIG. 3). The graph manager 156 sets the keys field 440 in the created record to identify the data associated with the representation 205. The graph manager 156 sets the region of interest field 445 in the created record to indicate the region of interest 230 (FIG. 2). Control then continues to block 599 where the logic of FIG. 5 returns.

Figure 6:
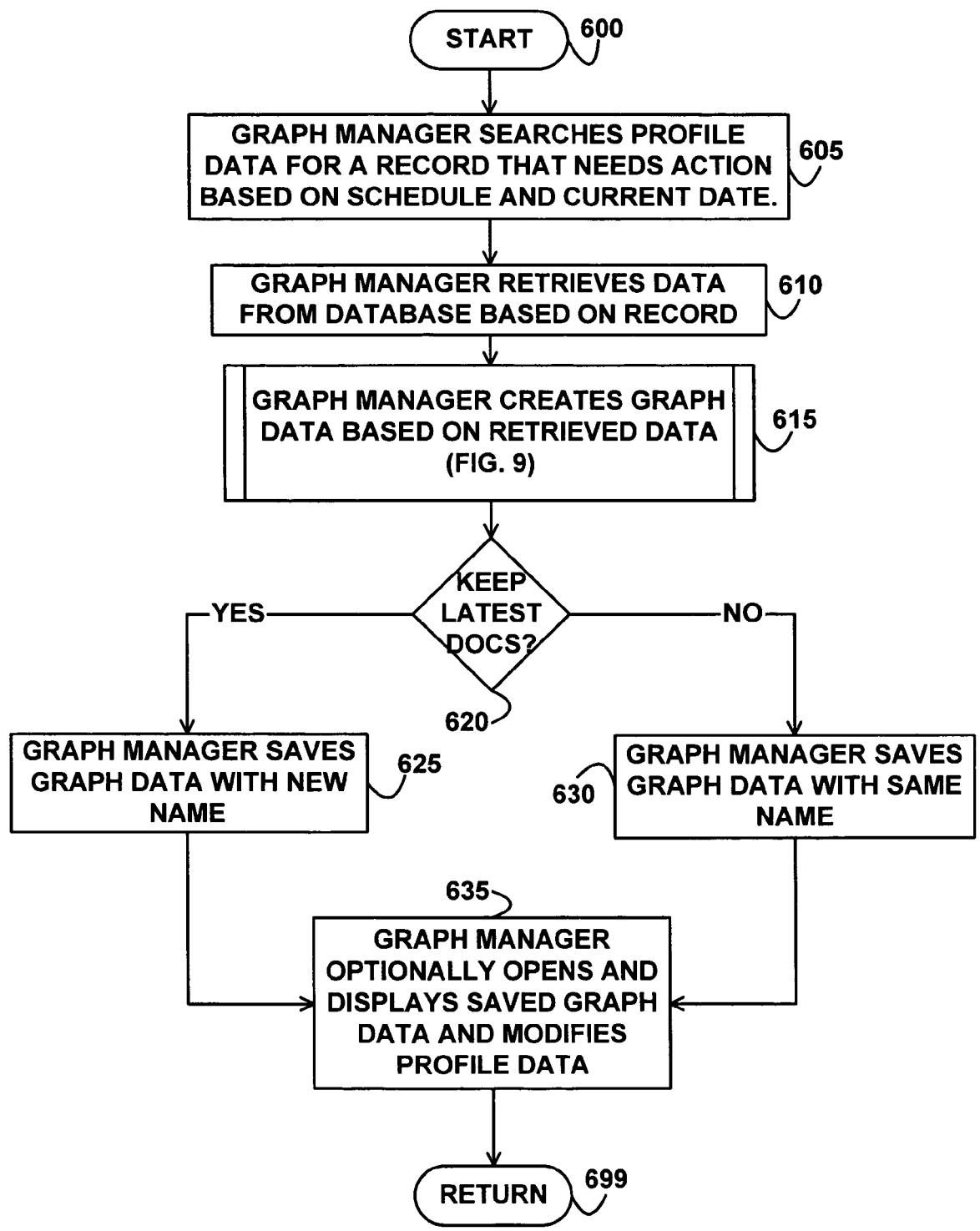
FIG. 6 depicts a flowchart of example processing for the creation of graph data based on the profile data, according to an embodiment of the invention.

FIG. 6 depicts a flowchart of example processing for the creation of the graph data 154 based on the profile data 160, according to an embodiment of the invention. Control begins at block 600. Control then continues to block 605 where the graph manager 156 searches the profile data 160 for a record that needs action based on the scheduled time 435 and the current date. For example, if the scheduled time 435 in a record in the profile data 160 indicates that the graph data 154 is to be created daily, and a day has elapsed since the previous time that the graph manager 156 created the graph data 154, then the graph manager 156 has found a record that needs action. As another example, if the scheduled time 435 in a record in the profile data 160 indicates that the graph data 154 is to be created weekly, and a week has elapsed since the previous time that the graph manager 156 created the graph data 154, then the graph manager 156 has found a record that needs action. As another example, if the scheduled time 435 in a record in the profile data 160 indicates that the graph data 154 is to be created monthly, and a month has elapsed since the previous time that the graph manager 156 created the graph data 154, then the graph manager 156 has found a record that needs action.

Control then continues to block 610 where the graph manager 156 retrieves data from the database 152 specified in the database identifier 415 based on the found record. The graph manager 156 calculates a time duration from the region of interest field 445 and uses the time duration, the x-axis field 425, the y-axis field 430, and the keys field 440 as parameters on a query, in an embodiment, to retrieve the appropriate data from the database 152. Using the example record 405 in FIG. 4, the graph manager 156 retrieves the number of users (the y-axis field 430) over time (the x-axis field 425) who accessed the server A and the server B (the keys 440) during the previous three days (the time duration calculated from the region of interest 445) from the current time. In this example, the graph manager 156 calculated the time duration as three days based on the elapsed time between the boundaries of the region of interest 445, which are "¹/₁₃" and "¹/₁₆."

Control then continues to block 615 where the graph manager 156 creates the graph data 154 based on the data retrieved from the database 152 and based on the x-axis 425 and the y-axis 430, as further described below with reference to FIG. 9. Control then continues to block 620 where the graph manager 156 determines whether to keep the latest graph documents based on selection of the save method 305 or 310 in the dialog 300 (FIG. 3). If the determination at block 620 is true, then the save method 305 was selected in the dialog 300, so control continues from block 620 to block 625 where the graph manager 156 saves the created graph in the graph data 154 with a new name. Control then continues to block 635 where the graph manager 156 optionally opens the saved graph data 154, displays the graph data 154 as previously described above with reference to FIGS. 2 and 5, and optionally changes the profile data 160 associated with the graph data 154, as previously described above with reference to FIGS. 3, 4, and 5. Control then continues to block 699 where the logic of FIG. 6 returns.

If the determination at block 620 is false, then the keep all documents save method 310 was selected in the dialog 300, so control continues from block 620 to block 630 where the graph manager 156 saves the created graph in the graph data 154 with the same name as the previous graph. Control then continues to block 635, as previously described above.

Figure 7:
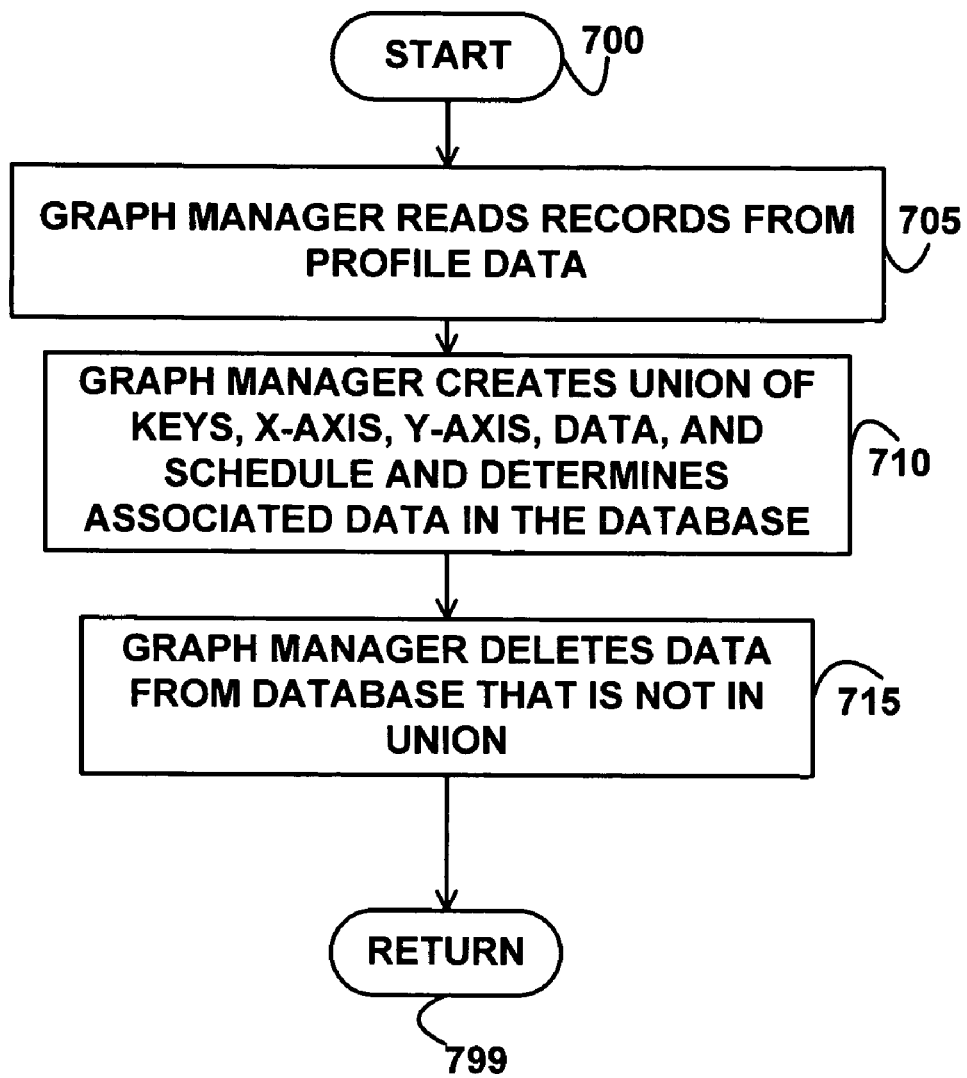
FIG. 7 depicts a flowchart of example processing for deleting data from a database based on the profile data, according to an embodiment of the invention.

FIG. 7 depicts a flowchart of example processing for deleting data from the database 152, according to an embodiment of the invention. Control begins at block 700. Control then continues to block 705 where the graph manager 156 reads records from the profile data 160. Control then continues to block 710 where, for all records in the profile data 160, the graph manager 156 creates the union of the keys field 440, the x-axis field 425, the y-axis field 430, the data field 420, and the schedule field 435 and determines the data in the database 152 specified by that union of fields and records in the profile data 160. Control then continues to block 715 where the graph manager 156 deletes data from the database 152 that is not in the union previously created as described at block 710. Control then continues to block 799 where the logic of FIG. 7 returns.

Figure 8:
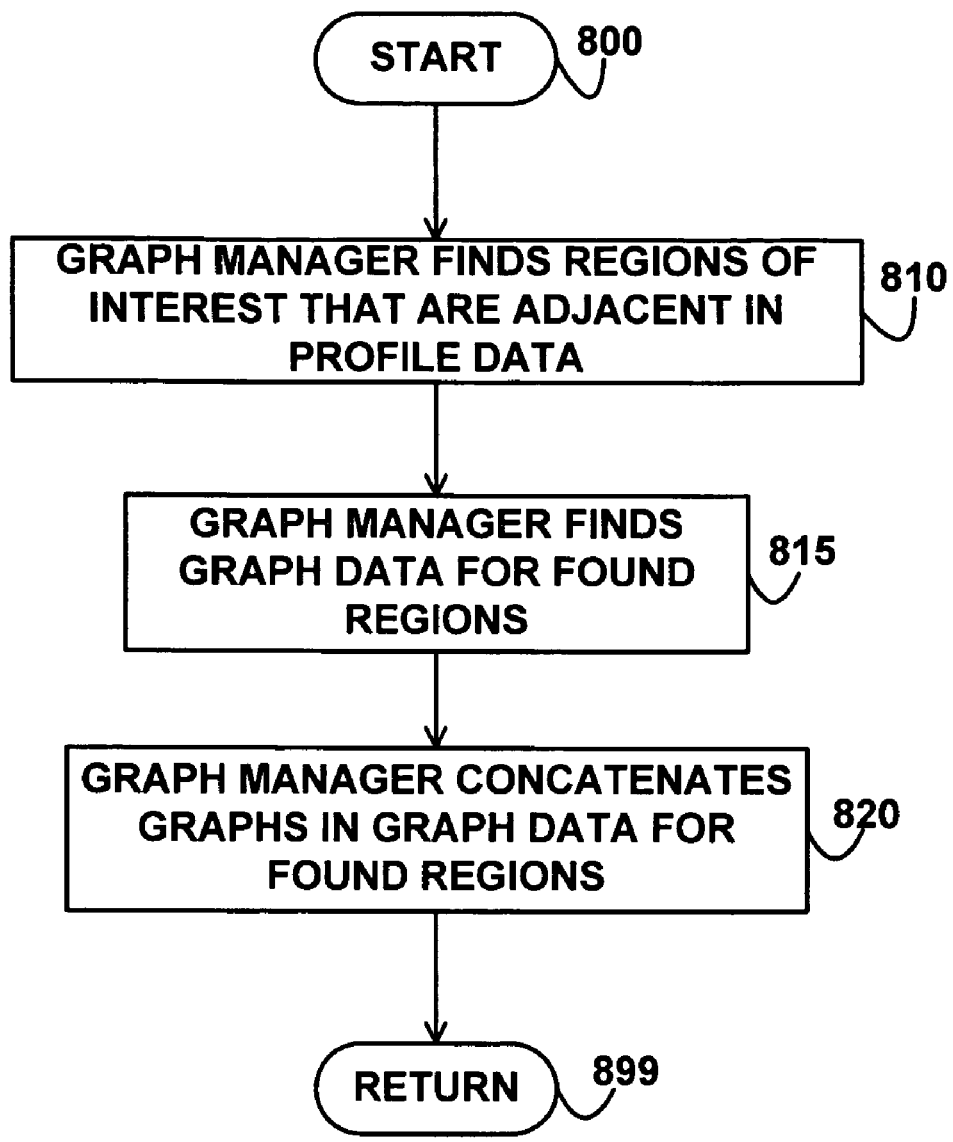
FIG. 8 depicts a flowchart of example processing for concatenating graphs based on the profile data, according to an embodiment of the invention.

FIG. 8 depicts a flowchart of example processing for concatenating graphs of regions of interest, according to an embodiment of the invention. Control begins at block 800. Control then continues to block 810 where the graph manager 156 searches the profile data 160 and finds those records with regions of interest 445 that are adjacent to each other in time. Control then continues to block 815 where the graph manager 156 finds the graph data 154 for the regions of interest 445 that were found at block 810. Control then continues to block 820 where the graph manager 156 concatenates the graph data 154 for the found adjacent regions of interest 445. Control then continues to block 899 where the logic of FIG. 8 returns.

Figure 9:
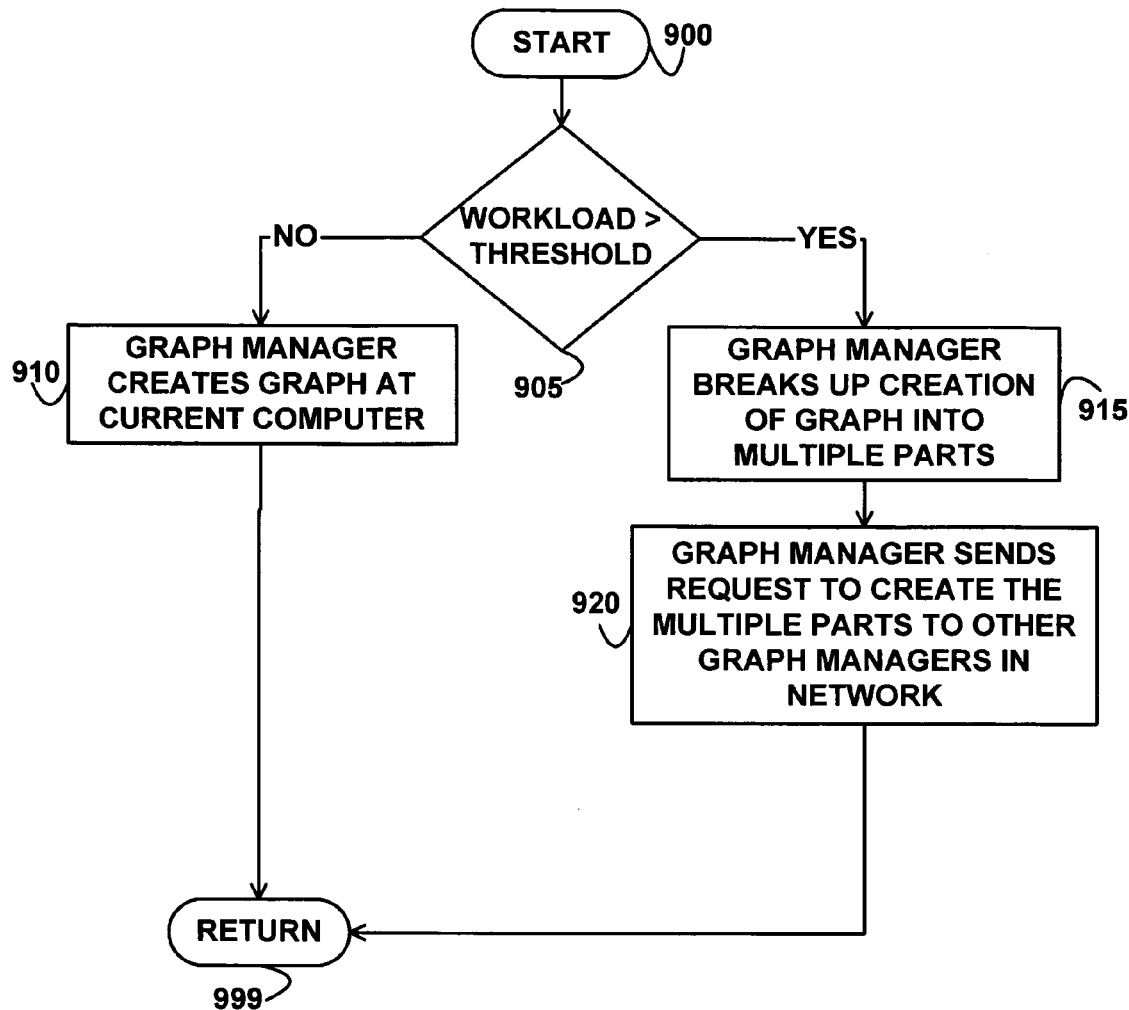
FIG. 9 depicts a flowchart of example processing for creating graphs, according to an embodiment of the invention.

FIG. 9 depicts a flowchart of example processing for creating the graph data 154, according to an embodiment of the invention. Control begins at block 900. Control then continues to block 905 where the graph manager 156 determines whether the workload of the computer system 100 is greater than a threshold. If the determination at block 905 is true, then the workload of the computer system 100 is greater than the threshold, so control continues to block 915 where the graph manager 156 breaks up or separates the creation of a graph data 154 into multiple parts. Control then continues to block 920 where the graph manager 156 sends requests with the units of work for the multiple parts to other graph managers 156 in the network 130 to create the multiple parts of the graph data 154. Control then continues to block 999 where the logic of FIG. 9 returns.

If the determination of block 905 is false, then the workload of the computer system 100 is not greater than the threshold, so control continues from block 905 to block 910 where the graph manager 156 creates the graph data 154 at the current computer system 100. Control then continues to block 999 where the logic of FIG. 9 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:

creating a plurality of profiles, wherein each of the plurality of profiles comprises a respective identification of a region in a respective first graphical representation of respective first data, a respective specification of the respective first data, a respective identification of a first value associated with an x-axis in the respective first graphical representation, a respective identification of a second value associated with a y-axis in the respective first graphical representation, and a respective schedule for retrieving respective second data from a database, wherein the creating the plurality of profiles is performed in response to a respective selection of the region in the respective first graphical representation of the respective first data;

retrieving the respective second data from the database on the respective schedule for a respective time duration of the respective region based on the respective specification of the respective first data;

creating an union of the plurality of profiles; and deleting data from the database that is not represented by the union.

2. The method of claim 1, further comprising: creating respective second graphical representations of the respective second data.

3. The method of claim 2, further comprising: separating the creation of at least one of the respective second graphical representations into a plurality of units of work for execution in a network if a workload at a computer exceeds a threshold.

4. The method of claim 3, further comprising: creating a third graphical representation associated with the respective regions that are adjacent in time.

5. The method of claim 4, wherein the respective specification of the respective first data indicates at least one respective field in the database.

6. The method of claim 5, wherein the respective specification of the respective first data further comprises:

an identification of a key in the respective first graphical representation.

7. A storage medium encoded with instructions, wherein the instructions when executed comprise:

creating a plurality of profiles, wherein each of the plurality of profiles comprises a respective identification of a region in a respective first graphical representation of respective first data, a respective specification of the respective first data, a respective identification of a first value associated with an x-axis in the respective first graphical representation, a respective identification of a second value associated with a y-axis in the respective first graphical representation, and a respective schedule for retrieving respective second data from a database, wherein the creating the plurality of profiles is performed in response to a respective selection of the region in the respective first graphical representation of the respective first data;

retrieving the respective second data from the database on the respective schedule for a respective time duration of the respective region based on the respective specification of the respective first data;

creating an union of the plurality of profiles; and deleting data from the database that is not represented by the union.

8. The storage medium of claim 7, further comprising:

creating respective second graphical representations of the respective second data.

9. The storage medium of claim 8, further comprising:

separating the creation of at least one of the respective second graphical representations into a plurality of units of work for execution in a network if a workload at a computer exceeds a threshold.

10. The storage medium of claim 8, wherein the respective specification of the respective first data further comprises an identification of a key in the respective first graphical representation.

11. The storage medium of claim 10, wherein the respective specification of the respective first data indicates at least one field in the database.

12. A method for configuring a computer, comprising:

configuring the computer to create a plurality of profiles, wherein each of the plurality of profiles comprises a respective identification of a region in a respective first graphical representation of respective first data, a respective specification of the respective first data, a respective identification of a first value associated with an x-axis in the respective first graphical representation, a respective identification of a second value associated with a y-axis in the respective first graphical representation, and a respective schedule for retrieving respective second data from a database wherein the respective specification of the respective first data further comprises an identification of a key in the respective first graphical representation, wherein the create of the plurality of profiles is performed in response to a respective selection of the region in the respective first graphical representation of the respective first data;

configuring the computer to retrieve the respective second data from the database on the respective schedule for a respective time duration of the respective region based on the respective specification of the respective first data;

configuring the computer to create an union of the plurality of profiles; and configuring the computer to delete data from the database that is not represented by the union.

13. The method of claim 12, further comprising:
configuring the computer to create respective second graphical representations of the respective second data.

14. The method of claim 13, further comprising:
configuring the computer to separate the creation of at least one of the respective second graphical representations into a plurality of units of work for execution in a network if a workload at the computer exceeds a threshold.

15. The method of claim 12, further comprising:
configuring the computer to create a third graphical representation associated with the respective regions that are adjacent in time.

16. The method of claim 12, wherein the respective specification of the respective first data indicates at least one respective field in the database.

* * * * *